United States Patent
Ganadillo et al.

(10) Patent No.: US 7,657,004 B2
(45) Date of Patent: Feb. 2, 2010

(54) SYSTEM AND METHOD FOR DETECTING A CONNECTION CONDITION OF A PHONE JACK

(75) Inventors: Marenz Sertino Ganadillo, Lexington, KY (US); Douglas Laurence Robertson, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 863 days.

(21) Appl. No.: 11/371,846

(22) Filed: Mar. 9, 2006

(65) Prior Publication Data

US 2007/0211885 A1 Sep. 13, 2007

(51) Int. Cl.
*H04M 1/24* (2006.01)
*H04M 3/08* (2006.01)
*H04M 3/22* (2006.01)

(52) U.S. Cl. .......... 379/1.01; 379/29.08; 379/27.05; 379/29.02; 379/413.04; 379/441

(58) Field of Classification Search ........... 379/1.01, 379/8, 22.02, 24, 26.01, 27.01, 27.05, 27.07, 379/29.02, 29.08, 29.11, 30, 413.01, 441, 379/442, 28.08
See application file for complete search history.

(56) References Cited

U.S. PATENT DOCUMENTS 5,420,915 A * 5/1995 Garrett .............. 379/143

* cited by examiner

*Primary Examiner*—Binh K Tieu

(57) ABSTRACT

A phone jack connection detection system and method of operating the same, including a phone jack circuit having a data access arrangement circuit in communication with at least two pins, a stimulus input in communication with the phone jack circuit, the stimulus input being adapted to communicate a stimulus to the phone jack circuit, and a detection circuit in communication with the phone jack circuit, the detection circuit being adapted to detect a response of the phone jack circuit to the stimulus and notify a user of the status of the connection.

20 Claims, 6 Drawing Sheets

SYSTEM AND METHOD FOR DETECTING A CONNECTION CONDITION OF A PHONE JACK

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present disclosure relates to peripheral devices equipped with a phone jack and, more particularly, to systems and methods for detecting a connection condition of a phone jack associated with a peripheral device.

2. Description of the Related Art

Peripheral devices, such as all-in-one printers (AIOs), multi-function peripherals (MFPs), printers, scanners, facsimile machines and the like, have become commonplace in the home and office environment and may be used to perform a wide variety of tasks. As used herein, "peripheral device" broadly refers to any stand-alone device or any device connected to a computer, a host, a network, a server or the like.

Peripheral devices typically include one or more phone jacks and/or one or more data connection ports, thereby allowing the peripheral device to connect and/or communicate with a network (e.g., a Public Switched Telephone Network ("PSTN")), a host device, a slave device or any other system. Referring to FIG. 1, a peripheral device, such as an all-in-one printer 10, may include two RJ-11 phone jack circuits 12a, 12b (the numeral "12" shall refer to phone jacks circuits generally) and one USB port 14. Each phone jack circuit 12a, 12b may include two or more connection pins 16, 17, 18, 19, 20, 21.

Referring to FIG. 2, each phone jack circuit 12a, 12b may include (i.e., may be integral with, associated with or connected to) a Data Access Arrangement ("DAA") circuit 22. A Data Access Arrangement (DAA) is an electronic interface within a computer and its modem to a public telephone line. A DAA is also sometimes called a Telephone Line Interface Circuit (or Module). DAAs are required in any device that attaches to the public switched telephone network, including facsimile machines, private branch exchanges or cable set-top boxes, and alarm systems. Among other things, the DAA isolates the electronic device from the higher voltage on the telephone line. DAA circuitry requires registration with the telephone system governing authority (such as the Federal Communications Commission in the U.S.). A DAA can be built into a computer's motherboard but is more commonly built into the modem.

The DAA 22 may connect the pins (only tip 19 and ring 18 pin are shown in FIG. 2) to the processor (not shown) of the printer 10. Therefore, as shown in FIG. 3, the printer 10 may be connected to a network 24, such as a PSTN, by connecting a phone line to one or more of the phone jack circuits 12a, 12b.

Modern peripheral devices may include USB ports positioned in the proximity of the phone jacks 12a, 12b. The close proximity may stem from the size of the peripheral device, the amount of circuit board space available, ergonomics or any of a number of reasons. In particular, as shown in FIG. 1, the USB port 14 and phone jacks 12a, 12b may be relatively the same size and shape and may be positioned generally adjacent to each other. Therefore, as shown in FIG. 4, modern peripheral devices may experience a short 26 between two or more of the pins 19, 18 of the jack 12 when a USB cable is inserted into the jack.

Accordingly, there is a need for a system and method for detecting when a USB connector is inserted into a phone jack. Furthermore, there is a need for a system and method for determining whether a phone jack is connected to a network.

SUMMARY OF THE INVENTION

In one aspect, a connection detection system is provided and includes a phone jack circuit having a DAA circuit in communication with at least two pins, a stimulus input in communication with the phone jack circuit, the stimulus input being adapted to communicate a stimulus to the phone jack circuit, and a detection circuit in communication with the phone jack circuit, the detection circuit being adapted to detect a response of the phone jack circuit to the stimulus.

In another aspect, a peripheral device is provided and includes a processor, a phone jack circuit electrically isolated from and in communication with the processor, the phone jack circuit including a data access arrangement circuit and at least two pins, a stimulus input in communication with the phone jack circuit and the processor, the stimulus input being adapted to introduce a stimulus to the phone jack circuit in response to a command from the processor, and a detection circuit in communication with the phone jack circuit and the processor, the detection circuit being adapted to detect a response of the phone jack circuit to the stimulus and communicate a signal indicative of the response to the processor.

In another aspect, a method for determining a connection condition of a phone jack circuit having at least two pins is provided. The method includes introducing a stimulus to the phone jack circuit, detecting a response of the phone jack circuit to the stimulus, and correlating the response to the connection condition.

Other aspects of the disclosed system and method will become apparent from the following description, the accompanying drawings and the appended claims.

DETAILED DESCRIPTION

Figure 1:
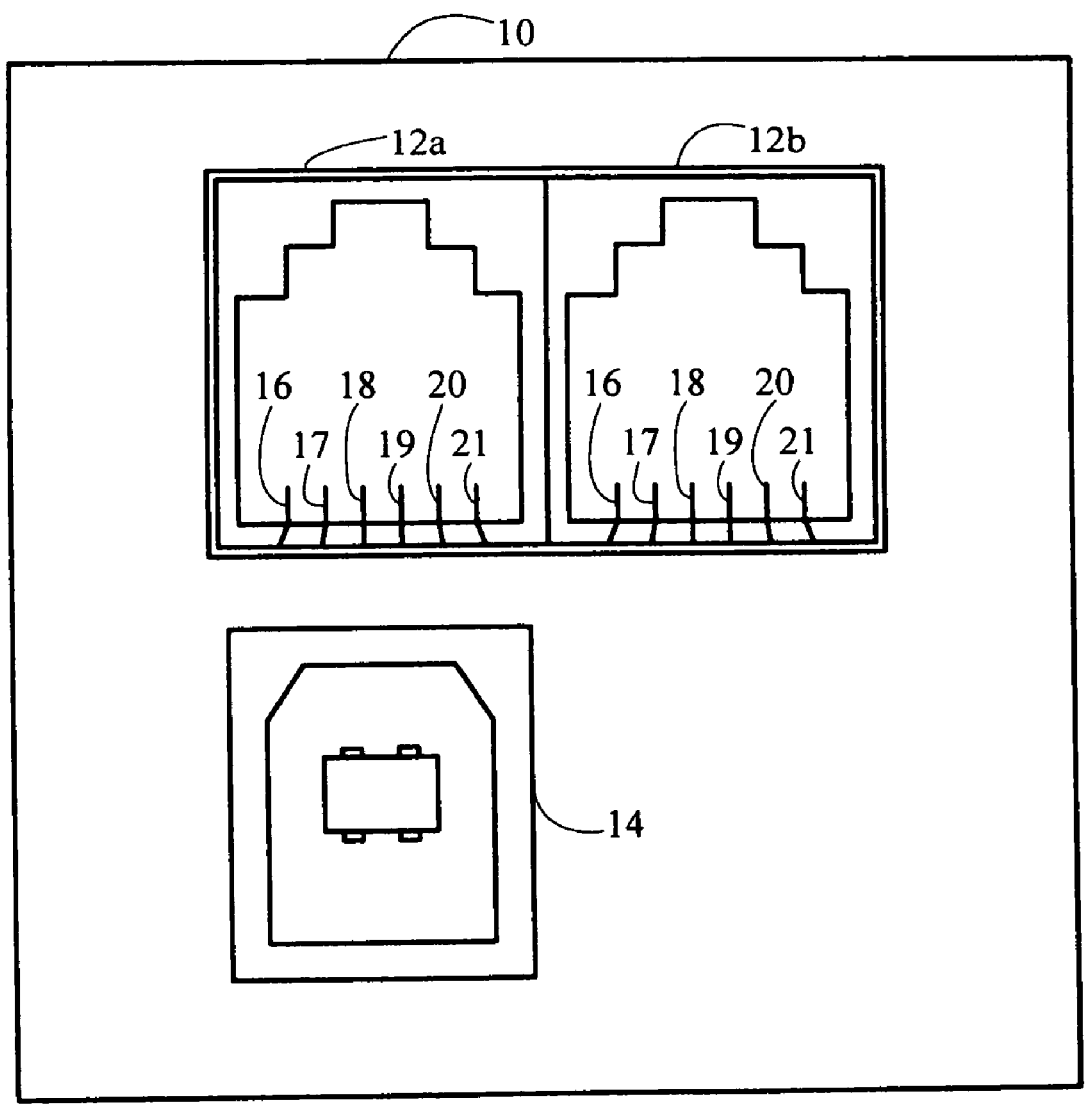
FIG. 1 is an elevational view of a peripheral device including two RJ-11 phone jacks and a USB connection port.
Figure 2:
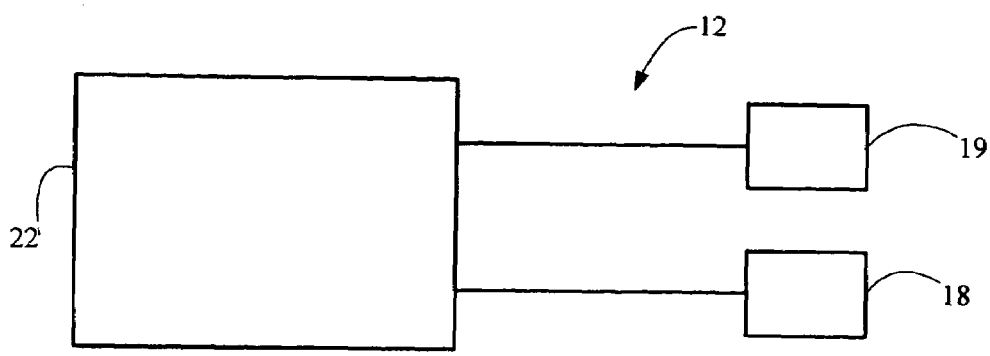
FIG. 2 is a block diagram of a prior art phone jack assembly including a tip pin and a ring pin.
Figure 3:
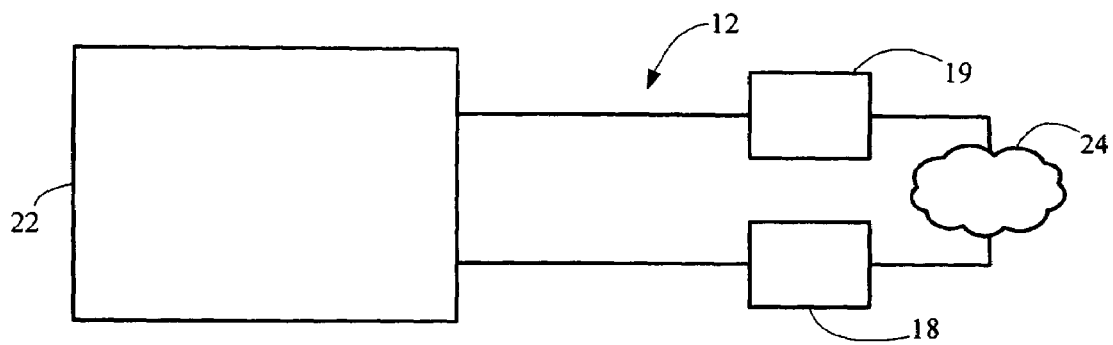
FIG. 3. is a block diagram of the prior art assembly of FIG. 2, wherein the tip and ring pins are connected to a network.
Figure 4:
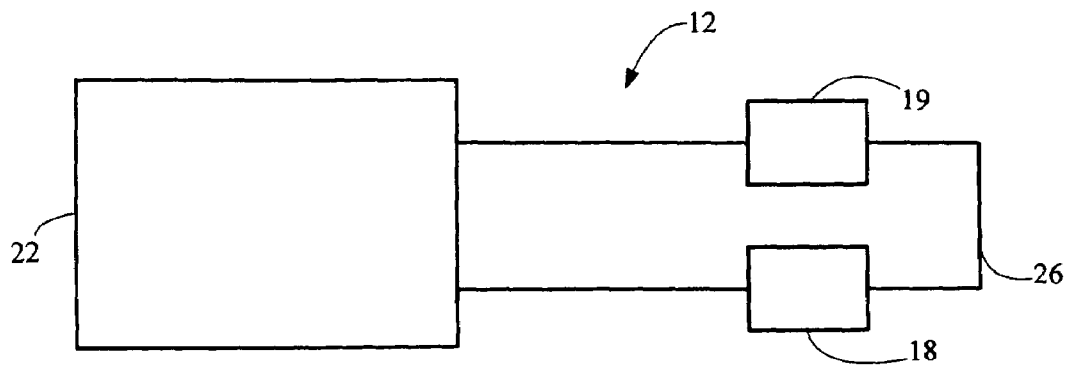
FIG. 4 is a block diagram of the prior art assembly of FIG. 2 including a short between the tip and ring pins.

In one aspect, a peripheral device, such as device 10 shown in FIG. 1, may be provided with a connection detection system. The connection detection system may, among other things, detect whether a network has been connected to a phone jack 12 of the device 10 and/or determine whether a short has occurred between two or more pins 16, 17, 18, 19, 20, 21 of the phone jack 12.

Figure 5:
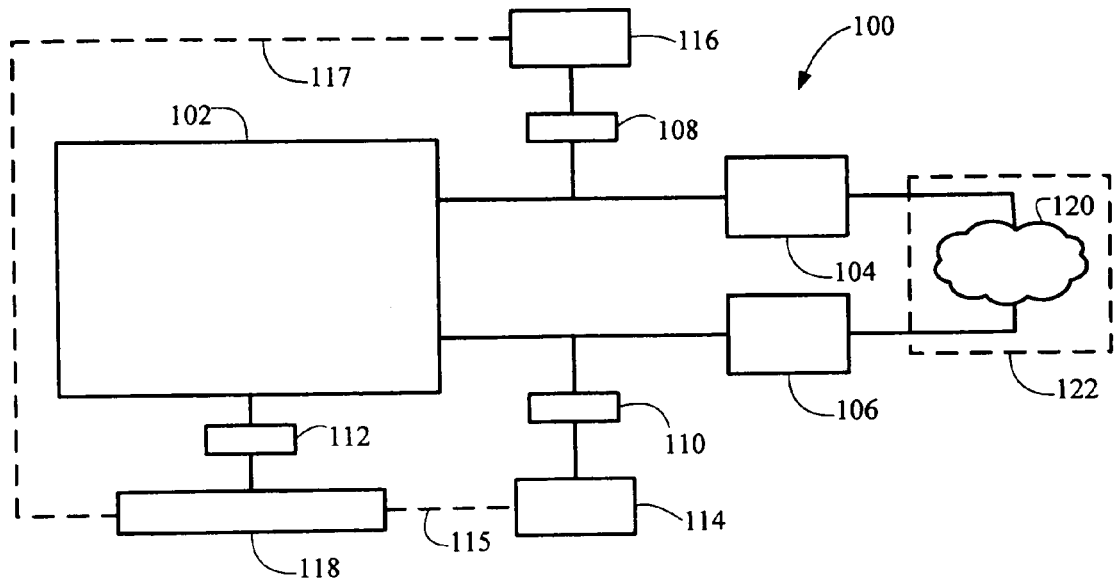
FIG. 5 is a block diagram of a first aspect of a connection detection system.

As shown in FIG. 5, a first aspect of a connection detection system, generally designated 100, may include a DAA circuit 102, a tip pin 104, a ring pin 106, a first isolation component 108, a second isolation component 110, a third isolation component 112, a stimulus input 114, a detection circuit 116 and a processor 118 associated with a peripheral device (not shown). The tip 104 and ring 106 pins may be associated with a phone jack 12 (e.g., an RJ-11 jack) of the peripheral device (see FIG. 1). The processor 118 may be in communication with the stimulus input 114 and the detection circuit 116 by communication lines 115, 117, which may be wired or wireless.

The tip 104 and ring 106 pins may be selectively connected to a network 120, such as a PSTN or the like, by way of a phone line, a cable, wirelessly or by other means. Thus, when the tip 104 and ring 106 pins are connected to a network 120, a load 122 may be applied to the system 100. The load 122 may be a characteristic impedance of the network 120, such as a 600 ohm or a 720 ohm complex line impedance of a PSTN.

In one aspect, the DAA circuit 102 may be any available Data Access Arrangement and may be adapted to extract digital data from analog signals received from the network 120. In another aspect, the DAA circuit 102 may be any circuit, system or the like capable of interfacing a peripheral device (e.g., a facsimile machine) with a network 120 (e.g., a PSTN). In another aspect, the DAA circuit 102 may be capable of detecting a digital PBX system connection. For example, the DAA 102 may be a model CX20493 SmartDAA available from Conexant Systems, Inc.

Stimulus input 114 may be any device, circuit or system capable of introducing an electrical stimulus into the system 100. For example, the electrical stimulus may be a DTMF (dual tone multifrequency) tone, a GPIO (general purpose input output) pin, a square wave from a pulse width modulator ("PWM") output of an application specific integrated circuit ("ASIC"), a sinusoidal wave or the like. The detection circuit 116 may be any device, circuit, system or sensor capable of detecting the stimulus and/or the effect of the stimulus on the load 122. For example, the detection circuit 116 may be a high impedance A/D input or the like.

Figure 6:
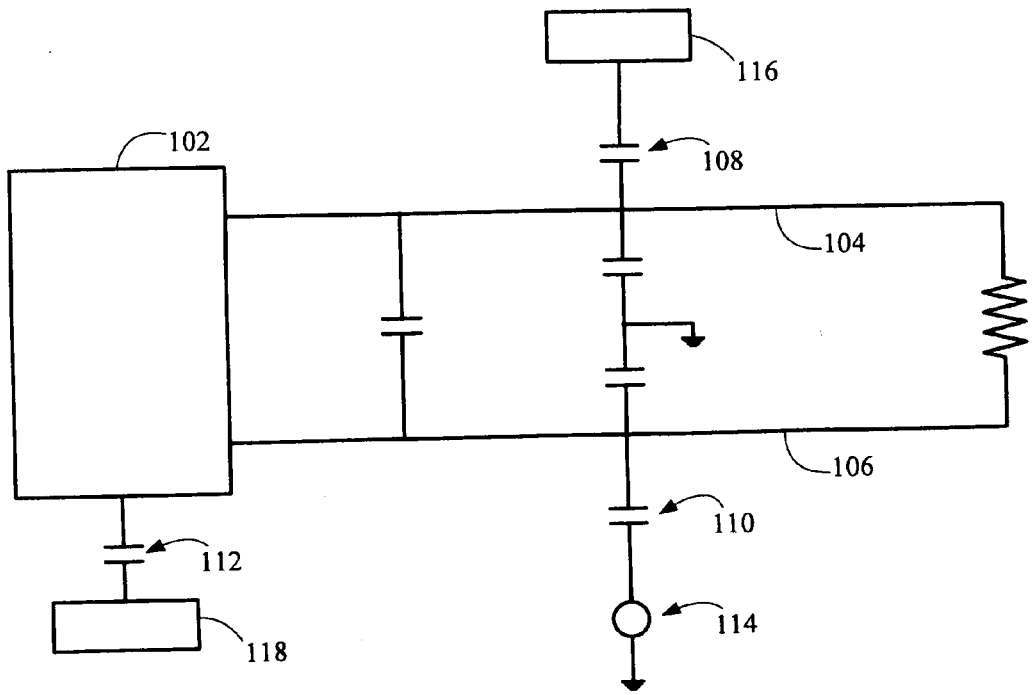
FIG. 6 is a schematic diagram of the connection detection system of FIG. 5.

The first, second and third isolation components 108, 110, 112 may be any isolation components capable of electrically isolating the main component side of the system from the DAA side of the system (i.e., no direct electrical connection between the processor 118 and the network 120). For example, isolation components 108, 110, 112 may be capacitors, Y-caps (see FIG. 6), transformers, optocouplers or the like.

As shown in FIG. 5, the first isolation component 108 may electrically isolate the detection circuit 116 from the DAA side of the system 100, the second isolation component 110 may electrically isolate the stimulus input 114 from the DAA side of the system and the third isolation component 112 may electrically isolate the processor 118 and other portions of the main component side of the system from the DAA side of the system.

Figure 7:
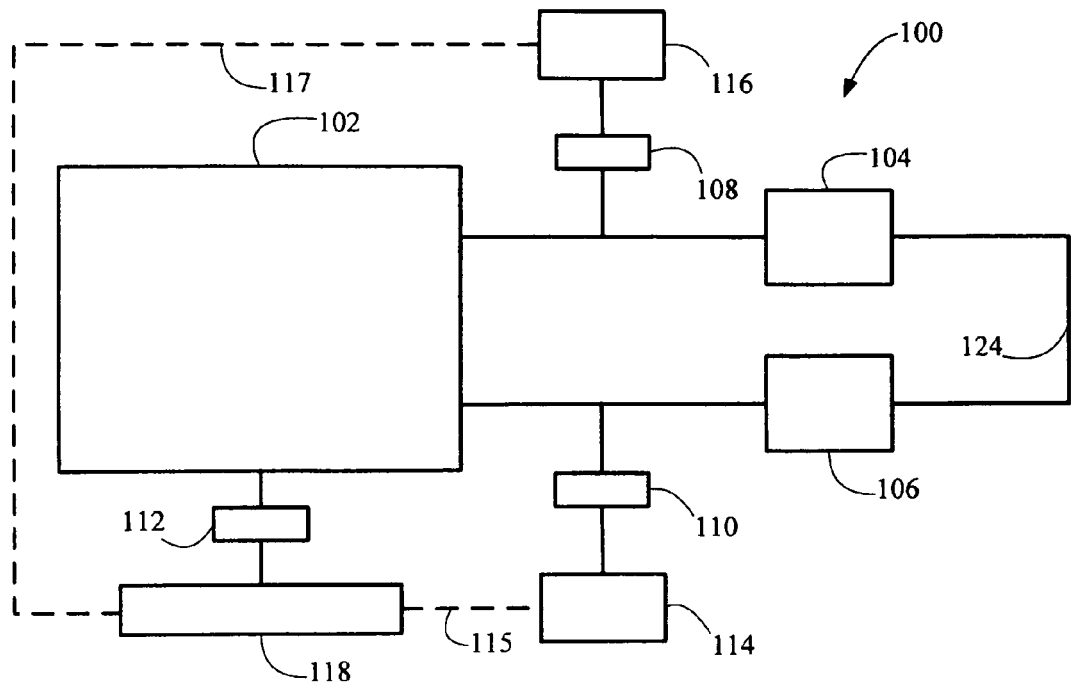
FIG. 7 is a block diagram of the system of FIG. 5 experiencing a short.

Accordingly, the stimulus input 114 may introduce a stimulus to the system 100 (e.g., to the Ring pin 106) by way of the second isolation component 110 (i.e., to the DAA side of the system). When the system 100 is connected to a network 120 that applies a load 122 (e.g., 600 ohms) to the system, as shown in FIG. 5, the stimulus may interact with the load 122 and a unique characteristic response may be detected, over the first isolation component 108, by the detection circuit 116. Alternatively, when the system is not connected to a network 120 (i.e., nothing is plugged into the jack), a second unique characteristic response may be detected by the detection circuit 116. Still alternatively, as shown in FIG. 7, when there is a short 124 between the tip 104 and ring 106 pins (e.g., when a USB connector is mistakenly inserted into the phone jack 12), a third unique characteristic response may be detected by the detection circuit 116.

Thus, each of the characteristic responses of the system 100 may be predetermined such that the processor 118 may determine whether or not the pins 104, 106 are connected to a network 120 and/or whether there is a short 124 between the pins 104, 106 based upon the response observed at the detection circuit 116.

Figure 8:
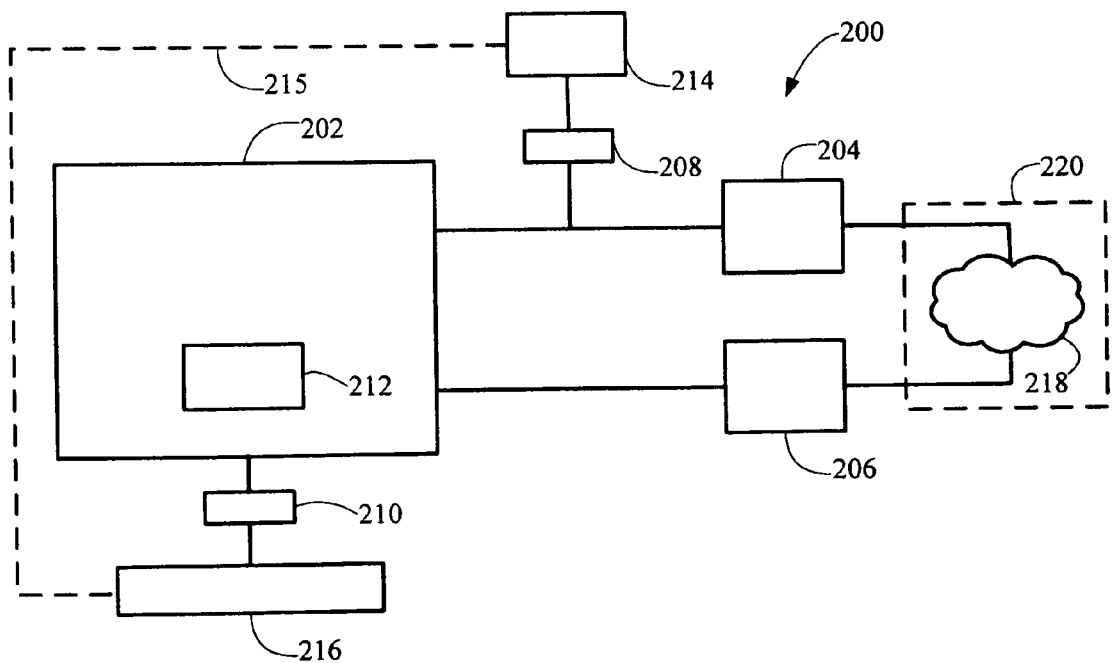
FIG. 8 is a block diagram of a second aspect of the connection detection system.

As shown in FIG. 8, a second aspect of a connection detection system, generally designated 200, may include a DAA circuit 202, a tip pin 204, a ring pin 206, first and second isolation components 208, 210, a stimulus input 212, a detection circuit 214 and a processor 216. The tip 204 and ring 206 pins may be associated with a phone jack 12 (e.g., an RJ-11 jack) of a peripheral device (see FIG. 1) and may be adapted to connect to a network 218 to apply a load 220 on the system. The processor 216 may be in communication with the detection circuit 214 by communication line 215 and with the stimulus input 212 and DAA circuit 202 over the second isolation component 210.

Thus, in the second aspect, the stimulus input 212 may be on the DAA side of the system 200 and the detection circuit 214 may be outside and isolated from the DAA side of the system.

Accordingly, the processor 216 may signal the stimulus input 212, by way of the second isolation component 210, to introduce a stimulus to the system 200. Based upon the characteristic response detected by the detection circuit 214 (by way of the first isolation component 208), the processor 216 may determine whether or not the pins 204, 206 are connected to a network 218 and/or whether there is a short between the pins 204, 206.

Figure 9:
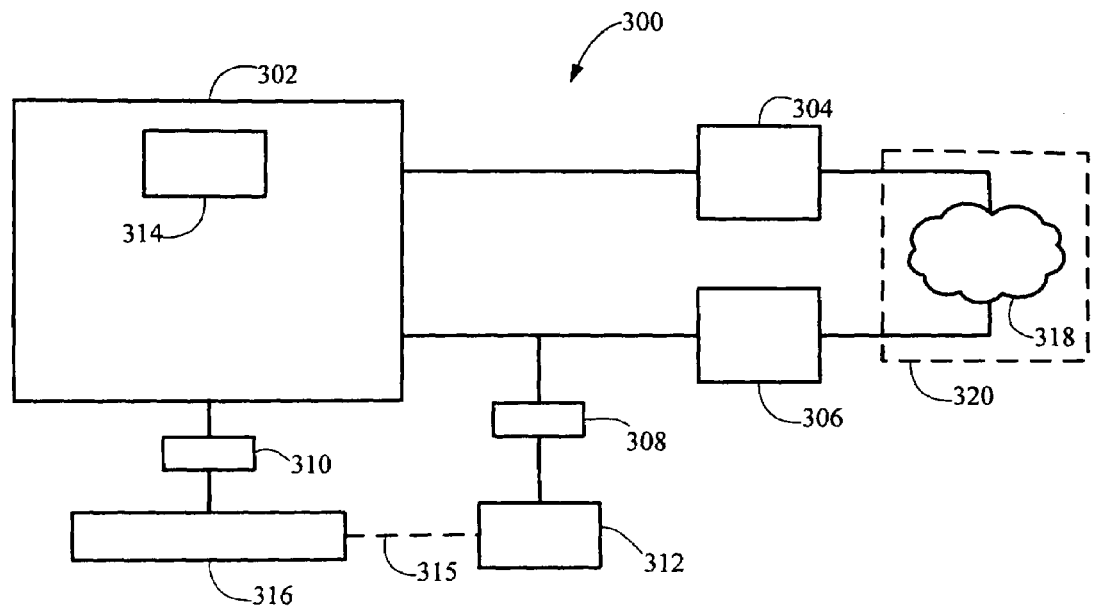
FIG. 9 is a block diagram of a third aspect of the connection detection system.

As shown in FIG. 9, a third aspect of a connection detection system, generally designated 300, may include a DAA circuit 302, a tip pin 304, a ring pin 306, first and second isolation components 308, 310, a stimulus input 312, a detection circuit 314 and a processor 316. The tip 304 and ring 306 pins may be associated with a phone jack 12 (e.g., an RJ-11 jack) of a peripheral device (see FIG. 1) and may be adapted to connect to a network 318 to apply a load 320 on the system. The processor 316 may be in communication with the stimulus input 312 by communication line 315 and with the detection circuit 314 and DAA circuit 302 over the second isolation component 310.

Thus, in the third aspect, the detection circuit 314 may be on the DAA side of the system 300 and the stimulus input 312 may be outside and isolated from the DAA side of the system.

Accordingly, the processor 316 may signal the stimulus input 312, by way of line 315, to introduce, by way of the first isolation component 308, a stimulus to the system 300. Based upon the characteristic response detected by the detection circuit 314 and communicated to the processor 316 over the second isolation component 310, the processor 316 may determine whether or not the pins 304, 306 are connected to a network 318 and/or whether there is a short between the pins 304, 306.

Figure 10:
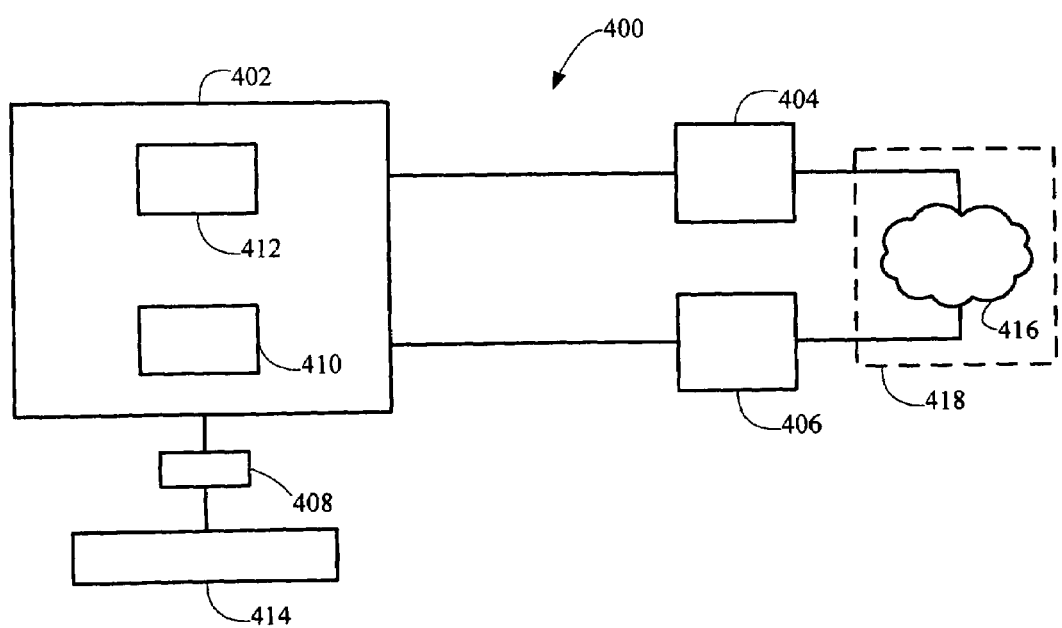
FIG. 10 is a block diagram of a fourth aspect of the connection detection system.

As shown in FIG. 10, a fourth aspect of a connection detection system, generally designated 400, may include a DAA circuit 402, a tip pin 404, a ring pin 406, an isolation component 408, a stimulus input 410, a detection circuit 412 and a processor 414. The tip 404 and ring 406 pins may be associated with a phone jack 12 (e.g., an RJ-11 jack) of a peripheral device (see FIG. 1) and may be adapted to connect to a network 416 to apply a load 418 on the system. The processor 414 may be in communication with the stimulus input 410, the detection circuit 412 and the DAA circuit 402 over the isolation component 408.

Thus, in the fourth aspect, the stimulus input 410 and the detection circuit 412 may be on the DAA side of the system 400. In an exemplary aspect, the stimulus input 410 and the detection circuit 412 may be part of the DAA 402. For example, the DC and/or AC drivers of the DAA 402 may be the stimulus input 410 and the tip and ring DC measurement input pin ("TRDC") of the DAA 402 may be the detection circuit 412.

Accordingly, the processor 414 may signal the stimulus input 410, by way of the isolation component 408, to introduce a stimulus to the system 400. Based upon the characteristic response detected by the detection circuit 412 and communicated to the processor 414 over the isolation component 408, the processor 414 may determine whether or not the pins 404, 406 are connected to a network 416 and/or whether there is a short between the pins 404, 406.

Figure 11:
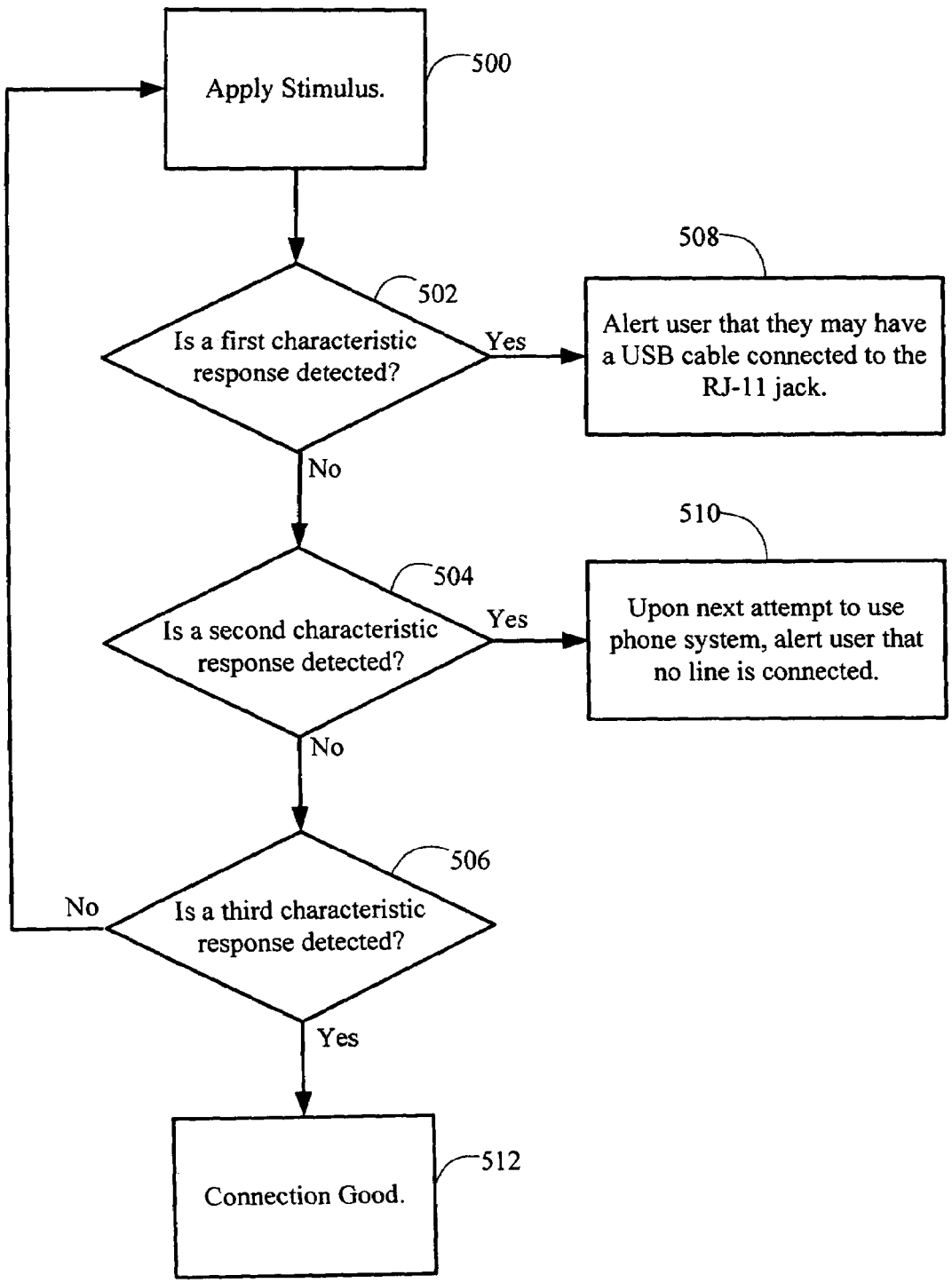
FIG. 11 is a flow diagram of one aspect of a connection detection method according to an aspect of the disclosed connection detection system.

Thus, referring to FIG. 11, the disclosed systems may detect a network connection and/or a short as follows. In general, a stimulus to applied and one of a plurality of characteristic responses is detected and correlated with an appropriate notification that is presented to the user. As shown in block 500, a stimulus may be applied to the system and the unique response may be monitored. When the response detected by the detecting circuit suggests that the system is experiencing a first characteristic such as a short caused by the insertion of a USB cable in the RJ-11 jack (block 502), the user is notified of the short condition, as shown in block 508. When the second characteristic response suggests that no network is connected to the system (block 504), the user is notified accordingly, as shown in block 510, that no line is connected or that is it not working. When the detected characteristic response suggests that the system is connected to an appropriate network (block 506), the user is notified accordingly, as shown in block 512, that the connection is good.

Although various aspects of the disclosed system and method have been shown and described, modifications may occur to those skilled in the art upon reading the specification. The present application includes such modifications and is limited only by the scope of the claims.

What is claimed is:

1. A connection detection system comprising:
   a phone jack circuit including a data access arrangement circuit in communication with at least two pins;
   a stimulus input in communication with said phone jack circuit, said stimulus input being adapted to communicate a stimulus to said phone jack circuit; and
   a detection circuit in communication with said phone jack circuit, said detection circuit being adapted to detect a response of said phone jack circuit to said stimulus.

2. The system of claim 1 wherein said stimulus includes at least one of a square wave, a sinusoidal wave, a DTMF tone and a GPIO pin.

3. The system of claim 1 further comprising at least one isolation component adapted to electrically isolate at least one of said stimulus input and said detection circuit from said phone jack circuit.

4. The system of claim 3 wherein said isolation component is at least one of a capacitor, a Y-cap, a transformer and an optocoupler.

5. The system of claim 3 wherein said stimulus input and said detection circuit are electrically isolated from said phone jack circuit.

6. The system of claim 1 wherein said stimulus input and said detection circuit are electrically coupled to said phone jack circuit.

7. The system of claim 6 wherein said stimulus input and said detection circuit are associated with said data access arrangement circuit.

8. The system of claim 1 further comprising a processor in communication with at least one of said stimulus input and said detection circuit.

9. The system of claim 8 wherein said stimulus input is adapted to communicate said stimulus in response to a signal from said processor.

10. The system of claim 1 wherein said detection circuit includes a high impedance A/D input.

11. The system of claim 1 further comprising a network, wherein said response includes a one characteristic response when said phone jack circuit is connected to said network and a another characteristic response when said phone jack circuit is not connected to said network.

12. The system of claim 1 wherein said network is a public switched telephone network.

13. The system of claim 1 wherein said response includes a first characteristic response when a first one of said pins is shorted with a second one of said pins and a second characteristic response when said first one of said pins is not shorted with said second one of said pins.

14. A peripheral device comprising:
   a processor;
   a phone jack circuit electrically isolated from and in communication with said processor, said phone jack circuit including a data access arrangement circuit and at least two pins;
   a stimulus input in communication with said phone jack circuit and said processor, said stimulus input being adapted to introduce a stimulus to said phone jack circuit in response to a command from said processor; and
   a detection circuit in communication with said phone jack circuit and said processor, said detection circuit being adapted to detect a response of said phone jack circuit to said stimulus and communicate a signal indicative of said response to said processor.

15. The peripheral device of claim 14 further comprising a user interface in communication with said processor, wherein said processor is adapted to communicated a notification based at least upon said response to a user by way of said user interface.

16. A method for determining a connection condition of a phone jack circuit having at least two pins, said method comprising:

introducing a stimulus to said phone jack circuit;

detecting a response of said phone jack circuit to said stimulus; and correlating said response to said connection condition.

17. The method of claim 16 wherein said response includes a first characteristic response when said phone jack circuit is connected to a network and a second characteristic response when said phone jack circuit is not connected to said network.

18. The method of claim 16 wherein said response includes a first characteristic response when a first one of said pins is shorted with a second one of said pins and a second characteristic response when said first one of said pins is not shorted with said second one of said pins.

19. The method of claim 16 wherein said connection condition is at least one of: (1) a network is connected, (2) a network is not connected and (3) a short in said phone jack circuit.

20. The method of claim 16 wherein said stimulus is introduced over an isolation component.

* * * * *

UNITED STATES PATENT AND TRADEMARK OFFICE
CERTIFICATE OF CORRECTION

PATENT NO. : 7,657,004 B2  Page 1 of 1
APPLICATION NO. : 11/371846
DATED : February 2, 2010
INVENTOR(S) : Ganadillo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1000 days.

Signed and Sealed this

Twenty-eighth Day of December, 2010

David J. Kappos
*Director of the United States Patent and Trademark Office*